United States Patent
Morita

(10) Patent No.: US 8,757,336 B2
(45) Date of Patent: Jun. 24, 2014

(54) DAMPING MECHANISM

(75) Inventor: Yuji Morita, Gifu (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 13/133,577

(22) PCT Filed: Dec. 24, 2009

(86) PCT No.: PCT/JP2009/071863
§ 371 (c)(1),
(2), (4) Date: Jun. 8, 2011

(87) PCT Pub. No.: WO2010/074323
PCT Pub. Date: Jul. 1, 2010

(65) Prior Publication Data
US 2011/0247906 A1 Oct. 13, 2011

(30) Foreign Application Priority Data
Dec. 24, 2008 (JP) ................. 2008-326959

(51) Int. Cl.
*F16F 9/348* (2006.01)
(52) U.S. Cl.
USPC ............. 188/283; 188/282.5; 188/322.15
(58) Field of Classification Search
USPC ............. 188/283, 282.5, 317, 322.15, 282.6
See application file for complete search history.

(56) References Cited

U.S. PATENT DOCUMENTS

| | | | | |
|---|---|---|---|---|
| 2,335,907 A | * | 12/1943 | Boor et al. ................. | 188/282.5 |
| 3,056,473 A | * | 10/1962 | Zeidler ........................ | 188/276 |
| 3,776,536 A | * | 12/1973 | Henderson .................. | 267/35 |
| 4,596,270 A | * | 6/1986 | Yang ............................. | 137/493 |
| 4,596,321 A | * | 6/1986 | Harper et al. ............ | 188/322.15 |
| 4,624,347 A | * | 11/1986 | Mourray .................. | 188/322.15 |
| 5,014,829 A | * | 5/1991 | Hare, Sr. ................... | 188/267.1 |
| 5,085,300 A | | 2/1992 | Kato et al. | |
| 5,595,269 A | * | 1/1997 | Beck .......................... | 188/282.6 |
| 6,053,486 A | * | 4/2000 | Schuitema et al. ........ | 267/64.15 |
| 6,260,678 B1 | * | 7/2001 | Moradmand et al. .... | 188/322.14 |

FOREIGN PATENT DOCUMENTS

| | | | | |
|---|---|---|---|---|
| GB | 2132734 A | * | 7/1984 | ............. F16F 13/00 |
| JP | 54-42890 | | 3/1979 | |
| JP | 57-171442 | | 10/1982 | |
| JP | 60-184448 | | 12/1985 | |
| JP | 61-7640 | | 1/1986 | |
| JP | 2-195039 A | | 8/1990 | |
| JP | 3-007548 U | | 1/1991 | |
| JP | 3-272339 A | | 12/1991 | |
| JP | 6-185562 A | | 7/1994 | |
| JP | 2005-195046 A | | 7/2005 | |
| JP | 2006-194335 A | | 7/2006 | |

* cited by examiner

*Primary Examiner* — Bradley King
(74) *Attorney, Agent, or Firm* — Rabin & Berdo, P.C.

(57) ABSTRACT

A damping mechanism (1) generates a damping force in response to movement of a fluid between a first fluid chamber (R1) and a second fluid chamber (R2) of a fluid pressure shock absorber. The damping mechanism (1) comprises a partition wall member (2) that defines the first fluid chamber (R1) and the second fluid chamber (R2), and a plurality of chokes (4) provided in parallel, which penetrate the partition wall member (2) to connect the first fluid chamber (R1) and the second fluid chamber (R2). A leaf valve (8, 9) having a valve body that is constituted by only a single leaf is preferably provided in an opening portion of the chokes (4). The chokes (4) generate a damping force that is substantially commensurate with a speed of the fluid passing therethrough, and the damping mechanism (1) exhibits a linear damping force characteristic while having a simple and compact constitution.

5 Claims, 4 Drawing Sheets

DAMPING MECHANISM

TECHNICAL FIELD

This invention relates to a damping mechanism provided in a fluid pressure shock absorber such as a hydraulic shock absorber for a vehicle.

BACKGROUND OF THE INVENTION

As a damping mechanism provided in a hydraulic shock absorber for a vehicle, JP 2006-194335 A, published by the Japan Patent Office in 2006, teaches a damping valve that is provided in an outlet of a port provided in a piston and includes a valve body constituted by a plurality of laminated leaves.

A first oil chamber and a second oil chamber are defined on an inner side of a cylinder of the hydraulic shock absorber by the piston, and a plurality of ports are provided in the piston. A first damping valve is provided in an opening portion of a part of the ports facing the first oil chamber, and a second damping valve is provided in an opening portion of remaining ports facing the second oil chamber.

When the piston displaces in a direction for causing the first oil chamber to contract, working oil in the first oil chamber pushes the second damping valve open and flows into the second oil chamber. When the piston displaces in a direction for causing the second oil chamber to contract, working oil in the second oil chamber pushes the first damping valve open and flows into the first oil chamber.

The first damping valve and second damping valve generate a damping force by applying a flow resistance to the working oil passing therethrough. To ensure that a sufficient damping force is obtained even when an operating speed of the hydraulic shock absorber is low, the leaves constituting the valve body are laminated in an axial direction over a plurality of layers.

SUMMARY OF THE INVENTION

When the valve body is constituted by a plurality of leaves laminated in the axial direction, an axial direction dimension of the valve increases and the constitution of the damping mechanism becomes complicated.

However, when the number of laminated leaves is reduced, the damping force generated in a low speed operating region of the hydraulic shock absorber is insufficient, and as a result, passenger comfort in the vehicle deteriorates.

It is therefore an object of this invention to realize a damping mechanism that exhibits a favorable damping characteristic on the basis of a simple constitution.

In order to achieve the above object, this invention provides a damping mechanism that generates a damping force in response to movement of a fluid between a first fluid chamber and a second fluid chamber of a fluid pressure shock absorber, comprising a partition wall member that defines the first fluid chamber and the second fluid chamber, and a plurality of chokes provided in parallel, which penetrate the partition wall member to connect the first fluid chamber and the second fluid chamber. The chokes generate a damping force that is substantially commensurate with a speed of the fluid passing therethrough.

The details as well as other features and advantages of this invention are set forth in the remainder of the specification and are shown in the accompanying drawings.

DESCRIPTION OF THE PREFERRED EMBODIMENTS

Figure 1:
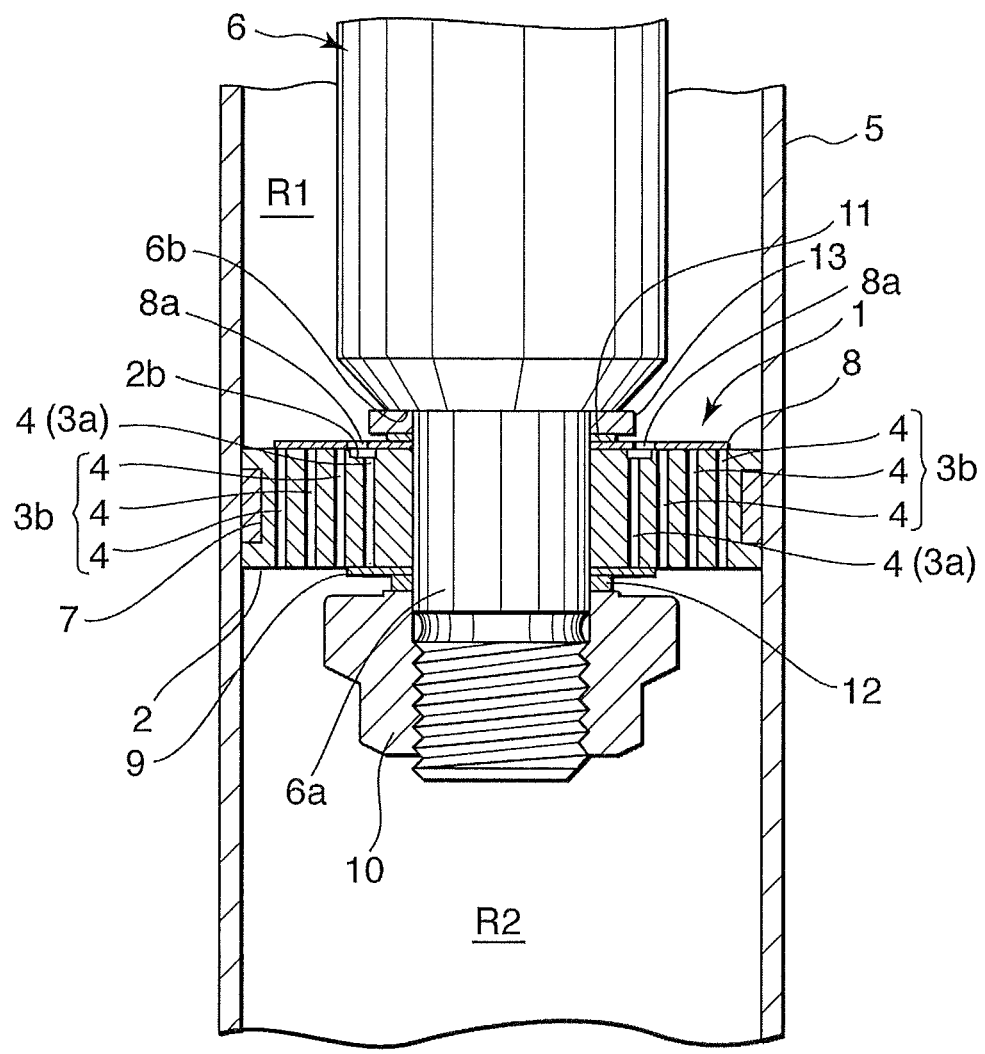
FIG. 1 is a longitudinal sectional view of a damping valve according to this invention.

Referring to FIG. 1 of the drawings, a piston 2 is accommodated inside a cylinder 5 of a hydraulic shock absorber to be free to slide. A piston rod 6 that invades the cylinder 5 from an axial direction is fixed to the piston 2. A first oil chamber R1 on the piston rod 6 side and a second oil chamber R2 on an opposite side are defined in an interior space of the cylinder 5 by the piston 2.

The hydraulic shock absorber is interposed between a vehicle body and a vehicle wheel of a vehicle, for example, to ensure that impacts and vibration from the vehicle wheel are not transmitted to the vehicle body. More specifically, for example, the piston rod 6 is latched to the vehicle body and the cylinder 5 is latched to the vehicle wheel. When the vehicle wheel receives an impact or vibrates, the piston rod 6 expands and contracts relative to the cylinder 5, and as a result, the piston 2 fixed to the piston rod 6 displaces within the cylinder 5. A damping mechanism 1 that causes working oil to flow between the first oil chamber R1 and the second oil chamber R2 is provided in the piston 2. As the piston 2 displaces within the cylinder 5, the damping mechanism 1 causes the working oil to flow between the first oil chamber R1 and the second oil chamber R2 and generates a damping force from a flow resistance.

The damping mechanism 1 according to this invention includes a large number of chokes 4 that penetrate the piston 2 to connect the first oil chamber R1 to the second oil chamber R2.

The piston 2 is a disc-shaped member which is fixed to a tip end of the piston rod 6 such that an outer periphery thereof slides on an inner periphery of the cylinder 5. A groove 7 for attaching a piston ring is formed around the entire outer periphery of the piston 2.

A small diameter portion 6a penetrating a center of the piston 2 is formed on the piston rod 6 via a step 6b. A male screw is formed on a tip end of the small diameter portion 6a, and by fastening a nut 10 to the male screw, the piston 2 is fixed to the tip end of the piston rod 6.

The choke 4 is formed in a cylindrical shape having greater length than diameter, and applies a frictional resistance based on a viscosity of the working oil to the working oil as it travels over a wall surface of the cylinder. A cross-section of the choke 4 is not necessarily limited to a circular shape, and may take an elliptical shape or the like. Further, it is not necessary for all of the chokes 4 to have an identical cross-section.

The diameter of the choke 4 is preferably small enough to ensure that the frictional resistance can be applied to the flow of the working oil even when the shock absorber operates at low speed. In this embodiment, the diameter of the choke 4 is set at 1 millimeter (mm) or less.

Figure 2:
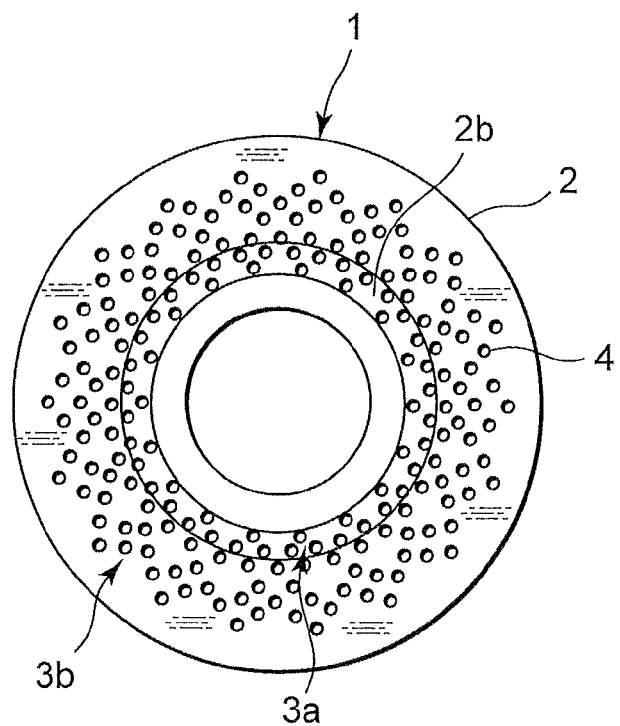
FIG. 2 is a plan view of a piston according to this invention.

Referring to FIG. 2, the chokes 4 are disposed at predetermined angular intervals on seven concentric circles having different diameters about the center of the piston 2. Eighteen chokes 4, thirty-six chokes 4, thirty-six chokes 4, twenty chokes 4, thirty-six chokes 4, thirty-six chokes 4, and eighteen chokes 4 are formed in the piston 2 at predetermined angular intervals respectively on the seven concentric circles from an innermost circle to an outermost circle. Hence, the total number of chokes 4 formed in the piston 2 is two hundred.

The chokes 4 are disposed such that no two chokes 4 on adjacent circles are aligned on a radial line extending from the center of the piston 2. Thus, the large number of chokes 4 can be arranged tightly on the limited surface area of the piston 2.

An annular recessed portion 2b is formed in a surface of the piston 2 facing the first oil chamber R1. Of the chokes 4, those disposed up to the second circle from the inner side open onto an inner side of the recessed portion 2b. The chokes 4 disposed on the third to seventh circles from the inner side open onto an outer side of the recessed portion 2b.

A first leaf valve 8 is laminated on the surface of the piston 2 facing the first oil chamber R1. A second leaf valve 9 is laminated on a surface of the piston 2 facing the second oil chamber R2.

Figure 3:
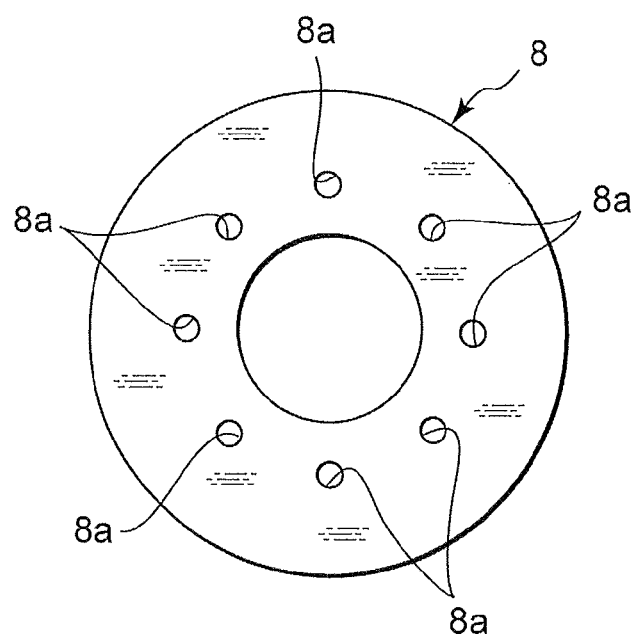
FIG. 3 is a plan view of a first leaf valve according to this invention.

Referring to FIG. 3, the first leaf valve 8 is constituted by a single circular plate member having a hole that penetrates the small diameter portion 6a of the piston rod 6 in its center and eight hole portions 8a arranged on a circle at equal angular intervals in positions corresponding to the recessed portion 2b on an outer side thereof. A diameter of the hole portions 8a is considerably larger than the diameter of the chokes 4.

The first leaf valve 8 is formed with a larger diameter than the diameter of the circle on which the outermost chokes 4 are disposed. When in contact with the piston 2, the first leaf valve 8 closes opening portions of the chokes 4 disposed on the third to seventh circles from the inner side but does not close the opening portions of the chokes 4 disposed up to the second circle from the inner side.

Similarly to the first leaf valve 8, the second leaf valve 9 is constituted by a single circular plate member having a hole that penetrates the small diameter portion 6a of the piston rod 6 in its center. A diameter of the second leaf valve 9 is smaller than the diameter of the first leaf valve 8. When in contact with the piston 2, the second leaf valve 9 closes the opening portions of the chokes 4 disposed up to the second circle from the inner side but does not close the opening portions of the chokes 4 disposed on the third to seventh circles from the inner side.

In the following description, the chokes 4 closed by the first leaf valve 8 will be referred to as the chokes 4 of a first group 3b and the chokes 4 closed by the second leaf valve 9 will be referred to as the chokes 4 of a second group 3a.

Referring back to FIG. 1, a disc-shaped spacer 13, a washer 11, and the first leaf valve 8 are sandwiched between the piston 2 and the step 6b of the piston rod 6. A pressure of the second oil chamber R2 is led through the chokes 4 of the first group 3b to act on the first leaf valve 8. When the pressure of the second oil chamber R2 is low, the entire first leaf valve 8, including the outer periphery, contacts the piston 2 such that the opening portions of the chokes 4 in the first group 3b are closed. When the pressure of the second oil chamber R2 rises, the first leaf valve 8 deforms using a position corresponding to an outer periphery of the washer 11 as a fulcrum such that the outer periphery is bent back toward the first oil chamber R1, thereby lifting from the opening portions of the chokes 4 in the first group 3b. As a result, the working oil in the second oil chamber R2 flows into the first oil chamber R1 through the chokes 4 of the first group 3b.

The second leaf valve 9 and a washer 12 are sandwiched between the piston 2 and the nut 10. A pressure of the first oil chamber R1 is led through the chokes 4 of the second group 3a to act on the second leaf valve 9. When the pressure of the first oil chamber R1 is low, the entire second leaf valve 9, including an outer periphery, contacts the piston 2 such that the opening portions of the chokes 4 in the second group 3a are closed. When the pressure of the first oil chamber R1 rises, the second leaf valve 9 deforms using a position corresponding to an outer periphery of the washer 12 as a fulcrum such that the outer periphery is bent back toward the second oil chamber R2, thereby lifting from the opening portions of the chokes 4 in the second group 3a. As a result, the working oil in the first oil chamber R1 flows into the second oil chamber R2 through the hole portions 8a in the first leaf valve 8 and the chokes 4 of the second group 3a.

To assemble the damping mechanism 1, the spacer 13, the washer 11, the first leaf valve 8, the piston 2, the second leaf valve 9, and the washer 12 are mounted in that order on the outer periphery of the small diameter portion 6a of the piston rod 6, whereupon the nut 10 is fastened to the tip end of the small diameter portion 6a. The leaf valves 8 and 9 are both formed from a single plate member and do not therefore take up space. Hence, an axial direction dimension of the damping mechanism 1 is suppressed to be small in comparison with a case in which leaf valves constituted by a plurality of laminated leaves are used.

With the constitution described above, the chokes 4 of the first group 3b are only used to allow the working oil to flow from the second oil chamber R2 into the first oil chamber R1. A working oil flow in this direction is formed during a contraction operation of the hydraulic shock absorber.

The chokes 4 of the second group 3a are only used to allow the working oil to flow from the first oil chamber R1 into the second oil chamber R2. A working oil flow in this direction is formed during an expansion operation of the hydraulic shock absorber.

During the expansion operation of the hydraulic shock absorber, the piston 2 displaces upward in the figure such that the working oil moves from the contracting first oil chamber R1 into the expanding second oil chamber R2 through the chokes 4 of the second group 3a. The chokes 4 apply a frictional resistance based on the viscosity of the working oil to the flow of the working oil, and a resistance based on a valve closing force of the second leaf valve 9 is also applied to the flow of the working oil. It should be noted, however, that in the damping mechanism 1, a valve opening resistance of the second leaf valve 9 constituted by a single plate member is small, and therefore the damping force is mainly dependent on the frictional resistance of the chokes 4.

To compare a choke with an orifice, an orifice that generates a damping force by temporarily reducing a cross-section of a flow passage increases an upstream-downstream differential pressure, or in other words the damping force, in the form of a quadratic curve relative to an increase in a flow rate, or in other words a stroke speed of the piston 2, regardless of the viscosity of the working oil.

On the other hand, the choke 4 that generates the damping force using a frictional resistance based on the viscosity of the working oil increases the damping force linearly within a range extending downward from a fixed speed relative to an increase in the flow rate, or in other words the stroke speed of the piston 2.

Figure 4:
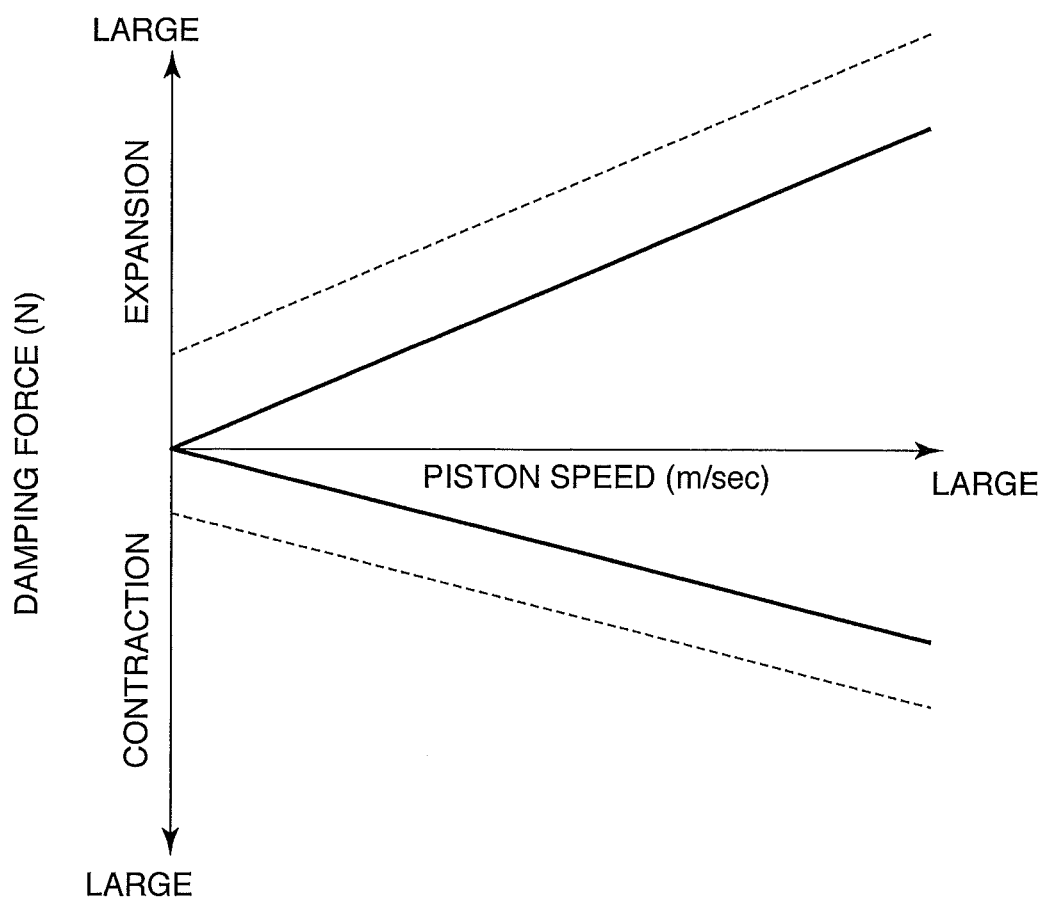
FIG. 4 is a diagram showing a damping characteristic of the damping valve.

Referring to FIG. 4, using this characteristic of the choke 4, the damping force generated by the damping mechanism 1 is increased substantially linearly relative to the stroke speed of the piston 2 during both the expansion operation and the contraction operation of the hydraulic shock absorber. In a hydraulic shock absorber for a vehicle, this damping force characteristic is preferable for establishing both a function for absorbing small vibration and a function for alleviating a large impact.

In the drawing, the damping force generated during expansion increases at a greater increase rate relative to the stroke speed of the piston 2 than the damping force generated during contraction for the following reason.

In the damping mechanism 1, the number of chokes 4 in the first group 3b is set at 146, while the number of chokes 4 in the second group 3a is set at 54. As a result of this difference in number, an overall damping force generated by the chokes 4 in the first group 3b, through which the working oil flows during expansion of the hydraulic shock absorber, is larger than an overall damping force generated by the chokes 4 in the second group 3a, through which the working oil flows during contraction of the hydraulic shock absorber. Hence, by modifying the number of chokes 4 in the first group 3b and the number of chokes 4 in the second group 3a in this manner, the damping force characteristics generated respectively during expansion and contraction of the hydraulic shock absorber can be differentiated as desired.

The numbers of chokes 4 in the first group 3b and the second group 3a are not limited to those described above and may be determined in accordance with a desired damping characteristic. It should be noted, however, that when the number of chokes 4 is extremely small, a flow passage sectional area produced by the chokes 4, or in other words a total sectional area of the chokes 4, is insufficient with respect to an increase in the piston speed, and as a result, the chokes 4 exhibit a similar flow rate characteristic to an orifice. When the diameter of the choke 4 is set at 1 mm in a typical shock absorber employed in a normal automobile, the number of chokes 4 in the first group 3b and the number of chokes 4 in the second group 3a are preferably set respectively at no less than 50.

In this hydraulic shock absorber, the second oil chamber R2 is connected to a reservoir in order to compensate for an amount of working oil corresponding to a volume of the piston rod 6 penetrating and withdrawing from the cylinder 5. Accordingly, a flow rate of the working oil that flows through the chokes 4 of the second group 3a relative to a stroke of the piston 2 in an expansion direction of the hydraulic shock absorber is equal to a flow rate of the working oil that flows through the chokes 4 of the first group 3b relative to a stroke of the piston 2 in a contraction direction of the hydraulic shock absorber.

As indicated by broken lines in the figure, by varying a material and a thickness of the first leaf valve 8 and the second leaf valve 9 so that the valve opening pressure increases, the damping force characteristic of the damping mechanism 1 can be offset to an increase side relative to all stroke speeds of the piston 2. Further, by setting the respective valve opening pressures of the first leaf valve 8 and the second leaf valve 9 at different values, the damping force characteristics during expansion and contraction can be adjusted independently of each other.

As described above, in the damping mechanism 1 according to this invention, the damping force is generated mainly by the chokes 4, and therefore a favorable damping force can be obtained in a wide stroke speed range of the piston 2. Moreover, the structure of the leaf valves 8 and 9 can be simplified. As a result, reductions can be achieved in the size and cost of the damping mechanism 1.

Figure 5:
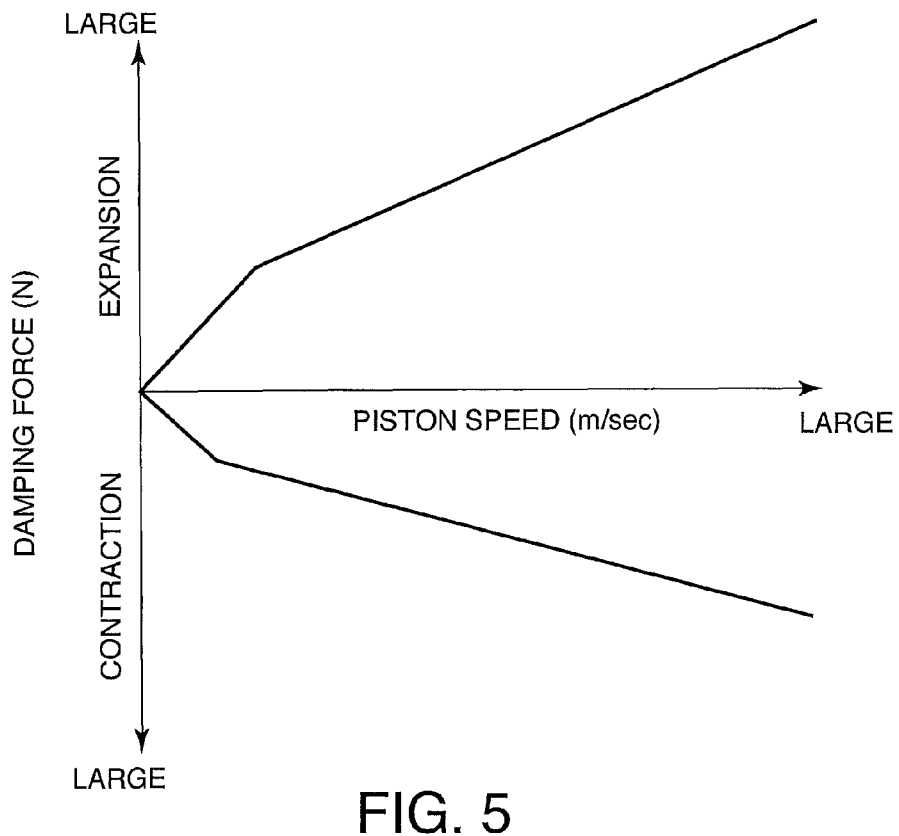
FIG. 5 is a diagram showing a damping characteristic of a damping valve according to a second embodiment of this invention.
Figure 6:
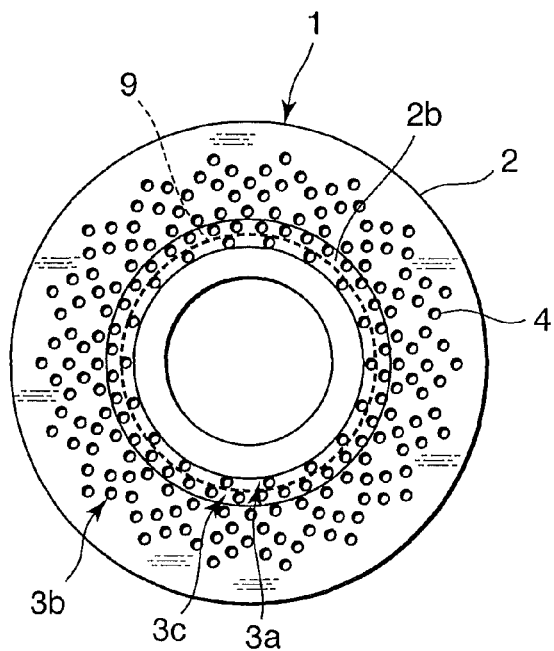
FIG. 6 is a plan view of a piston, illustrating positional relationships between first and second leaf valves and chokes according to the second embodiment of this invention.

Referring to FIGS. 5 and 6, a second embodiment of this invention will be described.

In the first embodiment, the chokes 4 are all set to be one-way, but in this embodiment, a part of the chokes 4 is constituted to allow a bidirectional flow of working oil.

Referring to FIG. 6, the second leaf valve 9 is formed with a smaller diameter than that of the first embodiment, as shown by a broken line in the figure, and therefore covers only the opening portions of the eighteen chokes 4 disposed on the first circle from the inner side. These chokes 4 constitute the chokes 4 of the second group 3a.

Similarly to the first embodiment, the first leaf valve 8 covers the opening portions of the 146 chokes 4 disposed on the third to seventh circles from the inner side. Similarly to the first embodiment, these chokes 4 constitute the chokes 4 of the first group 3b.

The opening portions of the thirty-six chokes 4 disposed on the second circle from the inner side are therefore not affected by either the first leaf valve 8 or the second leaf valve 9, and as a result, the working oil is allowed to flow both from the first oil chamber R1 into the second oil chamber R2 and from the second oil chamber R2 into the first oil chamber R1. These chokes 4 will be referred to as the chokes 4 of a third group 3c.

In this case, during both expansion and contraction of the hydraulic shock absorber, the working oil flows only through the chokes 4 of the third group 3c until the stroke speed of the piston 2 reaches a predetermined speed, and therefore a damping force that is dependent on the chokes 4 of the third group 3c is generated. When the stroke speed of the piston 2 exceeds the predetermined speed, the upstream-downstream differential pressure exceeds the valve opening pressure of the first leaf valve 8 or the second leaf valve 9, and as a result, the first leaf valve 8 or the second leaf valve 9 opens.

Referring to FIG. 5, the damping force generated by the damping mechanism 1 according to this embodiment increases by a large increase rate until the first leaf valve 8 or the second leaf valve 9 opens, and after the first leaf valve 8 or the second leaf valve 9 opens, the damping force increases gently. Hence, according to this embodiment, the damping force characteristic can be set with a greater degree of freedom that in the first embodiment.

In this embodiment, the chokes 4 of the third group 3c are not closed by either of the leaf valves 8 and 9. However, a similar action can be obtained by setting the diameter of the second leaf valve 9 such that an outer peripheral portion of the second leaf valve 9 covers a part of the chokes 4 on the second circle from the inner side, for example.

In this embodiment, the number of chokes 4 is preferably set as follows.

When the diameter of the choke 4 is set at 1 mm in a typical shock absorber employed in a normal automobile, a total number of chokes 4 in the first group 3b and the third group 3c is preferably set at no less than 50, and a total number of chokes 4 in the second group 3a and the third group 3c is preferably set at no less than 50.

The contents of Tokugan 2008-326959, with a filing date of Dec. 24, 2008 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in each of the embodiments described above, the damping mechanism 1 is provided in the piston 2. However, the damping mechanism 1 according to this invention may be applied to a base valve that is provided in a bottom portion of the cylinder 5 in order to connect the second oil chamber to a reservoir on the outside of the cylinder 5. In this case, the chokes 4 are provided to penetrate a disc-shaped base member that is fixed to the cylinder bottom portion so as to block the second oil chamber from the reservoir.

In consideration of the scope of application of the damping mechanism 1 according to this invention, the piston 2 and the base member will be referred to together as a partition wall member in this application.

In the embodiments described above, the leaf valves 8 and 9 are both formed in a circular shape, but the leaf valves 8 and 9 are not limited to a circular shape and may be formed in various shapes.

In the embodiments described above, this invention is applied to the bidirectional damping mechanism 1, but this invention may be applied to a unidirectional damping mechanism. In this case, chokes and a leaf valve covering one opening portion of the chokes may be provided, and a check valve that allows the working oil to flow without resistance only in an opposite direction to the flow of working oil permitted by the leaf valve may be provided in parallel with the chokes.

In this case, the damping mechanism generates a damping force only in response to an operation of the hydraulic shock absorber in one direction.

INDUSTRIAL APPLICABILITY

As described above, the damping mechanism according to this invention exhibits particularly favorable effects when applied to a hydraulic shock absorber for a vehicle, but may be applied to all types of dampers other than a hydraulic shock absorber for a vehicle.

The embodiments of this invention in which an exclusive property or privilege is claimed are defined as follows:

The invention claimed is:

1. A damping mechanism that generates a damping force in response to movement of a fluid between a first fluid chamber and a second fluid chamber of a fluid pressure shock absorber, comprising:
   a partition wall member that defines the first fluid chamber and the second fluid chamber;
   a plurality of chokes provided in parallel, which penetrate the partition wall member to connect the first fluid chamber and the second fluid chamber, wherein the chokes comprise chokes of a first group and chokes of a second group both of which generate a damping force that is proportional to a speed of the fluid passing therethrough;
   a first leaf valve that closes an opening portion of the chokes of the first group opening onto one end of the partition wall member, the first leaf valve comprising a valve body constituted by only a single leaf; and
   a second leaf valve that closes an opening portion of the chokes of the second group opening onto an opposite side end of the partition wall member, the second leaf valve comprising a valve body constituted by only a single leaf,
   Wherein a number of chokes of the first group is set at fifty or more, and a number of chokes of the second group is set at fifty or more, and
   wherein each of the chokes has a circular cross-section with a diameter of no more than 1 mm.

2. The damping mechanism as defined in claim 1, further comprising:
   a rod that penetrates respective centers of the partition wall member, the first leaf valve, and the second leaf valve, the rod including a step; and
   a nut screwed to a tip end of the rod,
   wherein one of the first leaf valve and the second leaf valve is sandwiched between the nut and the partition wall member and another one of the first leaf valve and the second leaf valve is sandwiched between the partition wall member and the step.

3. The damping mechanism as defined in claim 2, wherein the partition wall member is constituted by a piston that is housed in a cylinder to be free to slide, and
   the rod is fixed to the piston and forms a part of a piston rod projecting in an axial direction from the cylinder.

4. The damping mechanism as defined in claim 1, wherein the chokes of the first group are disposed in a region removed from the center of the partition wall member by at least a fixed distance,
   the chokes of the second group are disposed in a region that is closer to the center of the partition wall member than the chokes of the first group,
   the first leaf valve is a valve that closes an opening portion of the chokes in the first group facing the first fluid chamber,
   the second leaf valve is a valve that closes an opening portion of the chokes in the second group facing the second fluid chamber, and
   the first leaf valve includes a hole portion that connects the chokes in the second group to the first fluid chamber.

5. The damping mechanism as defined in claim 4, further comprising chokes of a third group disposed between a region in which the chokes of the first group are disposed and a region in which the chokes of the second group are disposed, having opening portions that are not closed by either of the leaf valves.

* * * * *